Jan. 24, 1961     F. R. KULL     2,969,250
SOCKET DRIVE
Filed Jan. 5, 1959
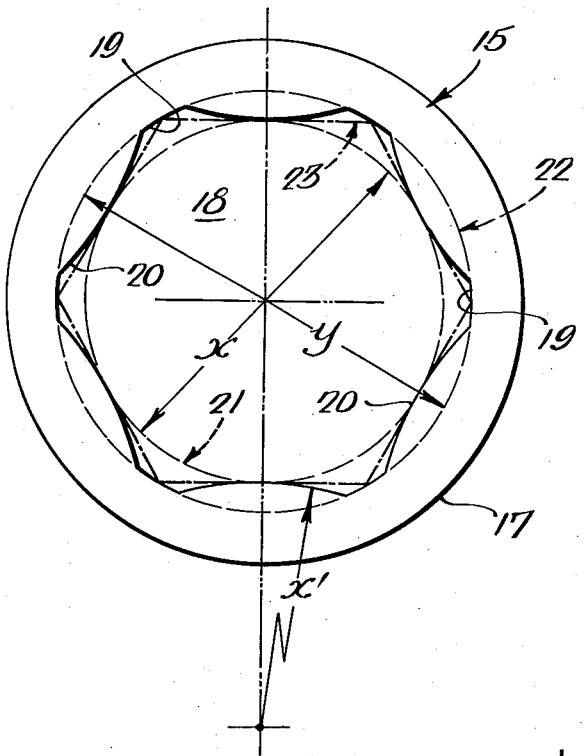
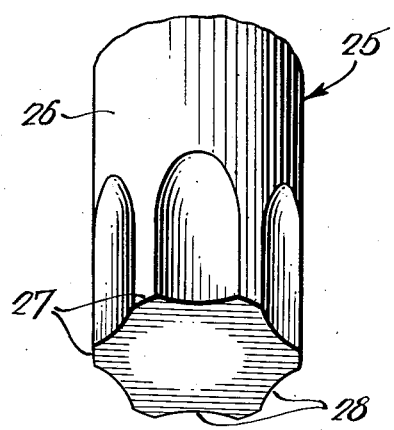
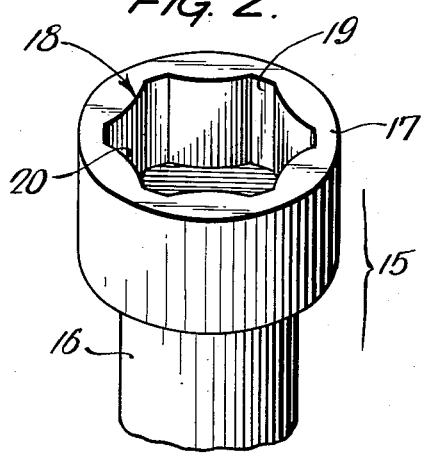
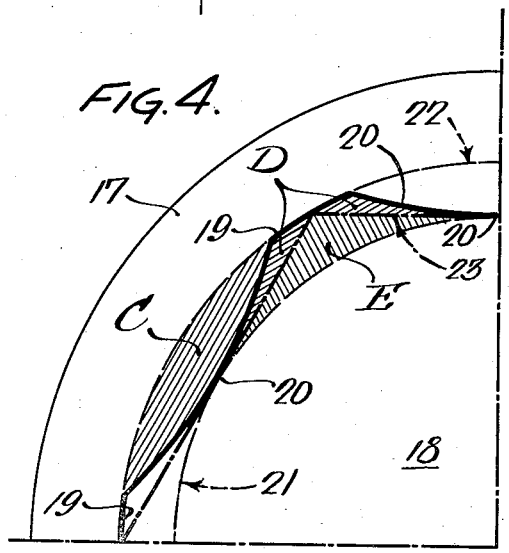
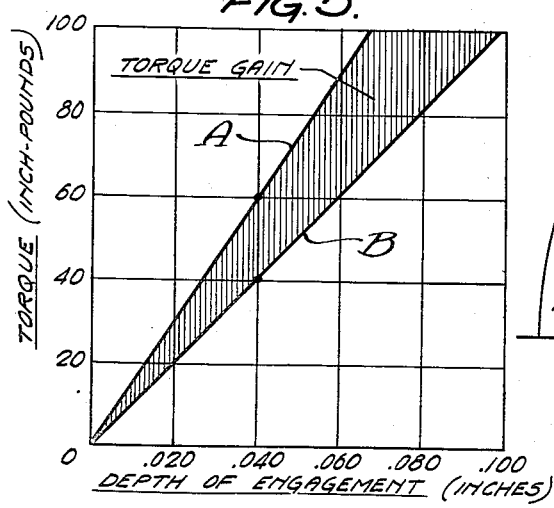
Inventor:
Francis R. Kull
by Howson & Howson
Attys.

United States Patent Office 2,969,250
Patented Jan. 24, 1961

2,969,250
SOCKET DRIVE
Francis R. Kull, Davisville, Pa., assignor to Standard Pressed Steel Co., Jenkintown, Pa., a corporation of Pennsylvania Filed Jan. 5, 1959, Ser. No. 784,997

3 Claims. (Cl. 287—126)

The present invention relates to torque couplings, and more particularly to releasable couplings having a male member telescopically engaged within the socket of a female member. The invention has particular application to socket-head fasteners and wrenches therefor.

A primarily object of the present invention is to provide a hollow-type drive having improved torque characteristics, but which is highly economical to produce.

More specifically, the present invention provides an improved hollow-type drive similar to a standard hexagon drive but having improved torque transmission characteristics.

The present invention also provides male and/or female members of novel design and capable of use with complementary members of both standard hexagon configuration and of the configuration of the present invention.

The coupling of the present invention also affords a substantial reduction in the depth of engagement to provide the desired torque characteristics. When applied to hollow-type fasteners, this enables a smaller head to be used in the fastener.

All of the objects of the present invention and the various features and details of the construction and operation thereof are more fully set forth hereinafter with reference to the accompanying drawing wherein:

Fig. 1 is a plan view of a female member of a coupling made in accordance with the present invention;

Fig. 2 is a perspective view of the member shown in Fig. 1;

Fig. 3 is a perspective view of a male member adapted to cooperate with the female member of Figs. 1 and 2 in a coupling;

Fig. 4 is a view similar to Fig. 1 but at a greatly enlarged scale to illustrate certain advantages of the present invention; and Fig. 5 is a graph which compares the torque characteristics of a drive of the present invention to the torque characteristics of a standard hexagon coupling.

The drawing illustrates the invention applied to a hollow-headed fastener 15 having a shaft 16 and an enlarged head portion 17. The head portion 17 has a recess 18 therein which is of a general hexagon configuration and consists of six outer peripheral surfaces 19 equally spaced circumferentially of the recess. The spaced surfaces 19 are connected by inwardly bowed work surfaces 20. As shown in Fig. 1, each work surface 20 is tangent to an imaginary circle 21 concentric with the cylindrical head portion 17 and having a diameter designated $x$ in Fig. 1.

Preferably, the working surfaces 20 are cylindrical in form having a radius of curvature substantially equal to the diameter of the tangential circle 21, as indicated at $x'$ in Fig. 1. The surfaces 19 are bowed slightly outwardly and form portions of a cylindrical surface 22 coaxial with the head portion 17 and having a diameter as indicated at $y$ in Fig. 1. The diameter $y$ is defined by the corners of a hexagon circumscribed about the imaginary circle 21, for example as indicated by the broken lines at 23 in Fig. 1. Thus, the socket 18 is adapted to receive a standard hexagon wrench of a size corresponding to the diameter $x$ of the circle 21.

To obtain the full advantages of the drive of the present invention, a male member 25 is employed to engage in the recess 18. The male member comprises a shaft 26 formed at its ends with six outer peripheral surfaces 27 equally spaced circumferentally of the shaft and interconnected by arcuate work surfaces 28. The surfaces 27 and work surfaces 28 mate with the surfaces 19 and the work surfaces 20 of the recess 18. The work surfaces 28 are cylindrical in form having a radius curvature substantially equal to the diameter of the imaginary circle to which they are tangent. The engagement of the male member 25 in the socket 18 provides substantially improved torque characteristics over the characteristics of a standard hex drive.

The improved torque characteristics are illustrated graphically in Fig. 5 wherein the torque limitations of a 1/8 inch drive of the present invention are represented by the line A and the torque limitations of a standard 1/8 inch hex drive are indicated by the line B. With reference to the graph, it is apparent that with an engagement of a depth of 0.040 inch, for example, the drive of the present invention is capable of withstanding torques of 60 inch-pounds whereas a standard hex drive is limited to torques of 40 inch-pounds. By the same token, to accommodate torques of 60 inch-pounds, the drive of the present invention requires a socket having a depth of only 0.040 inch whereas a standard hex drive requires a socket having a depth of 0.058 inch. Thus, the present invention enables the use of a shallower socket in a drive having a given outside dimension, thereby permitting the use of a reduced head portion. The depth of the socket is less than the diameter of the imaginary circle 21, preferably, approximately one half the diameter $x$. In the present instance, the socket 18 is adapted to receive a 1/8 inch Allen wrench, but is only 1/16 inch in depth.

It is believed that a substantial factor in obtaining the improved torque characteristics is the reduction in the compressive force directed radially inward of the male member adjacent the outermost periphery thereof for a given turning moment. The turning moment applies a given force against the outermost point on the arcuate surface 20. The reaction force which is normal to the surface 20 exerts a shearing force along the surface of the surface 27 and a camming compressive force radial of the socket. On a standard hex drive, on the other hand, the turning force exerts a force against the socket, and the reaction force produces a shearing component and a compressive camming force. Since the angle of the surface 20 to the radius is less with a drive of the present invention, the compressive camming force is less and the tendency for the outermost portion of the male element of the drive to peen over or slip is substantially less than the standard hex drive. Furthermore, the torque characteristics of the drive are improved since the area C in the female member tending to shear is more nearly equal to the area $D+E$ tending to shear in the male member. This is opposed to a conventional hex drive wherein the area of the female member tending to shear is the area $C+D$ and the area in the male member tending to shear is the area E. It is apparent that the area C is more nearly equal to the area $D+E$ than the area $C+D$ is to the area E.

While a particular embodiment of the present invention has been herein illustrated and described, it is not intended to limit the invention to the precise disclosure herein, but changes and modifications may be made therein and thereto within the scope of the following claims.

I claim:

1. A coupling comprising a pair of telescopically engaged male and female members, at least one member having a plurality of outwardly-bowed outer peripheral surfaces equally spaced circumferentially about its periphery and defining portions of a cylindrical surface coaxial with said member, and work surfaces interconnecting said outer peripheral surfaces comprising inwardly-bowed arcuate surfaces, each disposed tangential to an imaginary circle coaxial with the cylindrical surface defined by said outer peripheral surfaces and of diameter greater than the depth of engagement of said male member in said female member, said inwardly-bowed arcuate surfaces being cylindrical in form with a radius of curvature equal to the diameter of the imaginary circle to which they are tangent, a straight line tangent to said imaginary circle at its point of tangency with each of said inwardly-bowed surfaces intersecting the outer peripheral surfaces adjacent to said inwardly-bowed cylindrical surface at the mid-points thereof.

2. A coupling according to claim 1 wherein said one member constitutes the female member and consists of a fastener comprising a socketed head portion, said socket having six outer peripheral surfaces interconnected by a like number of inwardly-bowed arcuate surfaces.

3. A coupling according to claim 2 wherein said male member comprises a cylindrical member having six recessed work surfaces defining therebetween a like number of outer peripheral surfaces, said recessed work surfaces being arcuate in form and conforming to the curvature of the inwardly-bowed surfaces of said socket to mate therewith.

References Cited in the file of this patent

UNITED STATES PATENTS

| | | |
|---|---|---|
| 1,330,673 | Anderson | Feb. 10, 1920 |
| 1,833,993 | Hill | Dec. 1, 1931 |
| 2,083,092 | Ricker | June 8, 1937 |
| 2,136,947 | Morgan | Nov. 15, 1938 |
| 2,375,249 | Richer | May 8, 1945 |
| 2,777,353 | Willis | Jan. 15, 1957 |
| 2,843,406 | Wray | July 15, 1958 |
| 2,848,916 | Reynolds | Aug. 26, 1958 |